(12) United States Patent
Reddy et al.

(10) Patent No.: US 6,881,708 B2
(45) Date of Patent: Apr. 19, 2005

(54) COMPOSITIONS FOR SOLVING LOST CIRCULATION PROBLEMS

(75) Inventors: B. Raghava Reddy, Duncan, OK (US); Jiten Chatterji, Duncan, OK (US); Roger S. Cromwell, Walters, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 10/283,877

(22) Filed: Oct. 30, 2002

(65) Prior Publication Data

US 2003/0092582 A1 May 15, 2003

Related U.S. Application Data

(62) Division of application No. 09/999,313, filed on Nov. 15, 2001, now Pat. No. 6,508,306.

(51) Int. Cl.$^7$ ............................................. C09K 7/00
(52) U.S. Cl. ................. 507/117; 507/118; 507/125; 507/135; 507/219; 507/221; 507/231; 507/259; 175/64; 523/130
(58) Field of Search ........................... 166/295; 175/64; 507/117, 118, 219, 221, 135, 259, 125, 231; 523/130

(56) References Cited

U.S. PATENT DOCUMENTS

| | | | | |
|---|---|---|---|---|
| 3,267,174 A | * | 8/1966 | Fry et al. ................... 525/163 |
| 3,640,675 A | * | 2/1972 | Thomas ....................... 8/115.6 |
| 3,864,195 A | * | 2/1975 | Patterson .................... 428/94 |
| 3,996,177 A | * | 12/1976 | Ludwig ....................... 524/512 |
| 4,308,184 A | * | 12/1981 | Thoma et al. ............... 524/512 |
| 4,390,658 A | * | 6/1983 | Graetz et al. ............... 524/512 |
| 4,391,643 A | | 7/1983 | Murphey ..................... 106/74 |
| 4,515,216 A | | 5/1985 | Childs et al. ............... 166/293 |
| 4,537,918 A | * | 8/1985 | Parcevaux et al. ........... 523/130 |
| 5,377,759 A | | 1/1995 | Surles ......................... 166/295 |
| 5,458,195 A | | 10/1995 | Totten et al. ................. 166/293 |
| 5,501,277 A | | 3/1996 | Onan et al. .................. 166/293 |
| 5,569,324 A | | 10/1996 | Totten et al. ................. 106/696 |
| 5,721,309 A | * | 2/1998 | Sharma et al. .............. 524/506 |
| 5,800,911 A | * | 9/1998 | Sankey et al. ............... 428/213 |
| 5,823,273 A | | 10/1998 | Ravi et al. ................... 175/72 |
| 5,913,364 A | | 6/1999 | Sweatman et al. ........... 166/281 |
| 5,969,006 A | | 10/1999 | Onan et al. .................. 523/166 |
| 6,060,434 A | | 5/2000 | Sweatman et al. ........... 507/216 |
| 6,133,203 A | | 10/2000 | Estes et al. .................. 507/209 |
| 6,167,967 B1 | | 1/2001 | Sweatman .................... 166/281 |
| 6,171,386 B1 | | 1/2001 | Sabins ......................... 106/727 |
| 6,196,315 B1 | | 3/2001 | Surles et al. ................. 166/293 |
| 6,207,250 B1 | * | 3/2001 | Bullock et al. .............. 428/137 |
| 6,258,757 B1 | | 7/2001 | Sweatman et al. ........... 507/219 |
| 6,271,181 B1 | | 8/2001 | Chatterji et al. ............. 507/219 |
| 6,702,044 B1 | * | 3/2004 | Reddy et al. ................. 175/64 |
| 6,823,940 B1 | * | 11/2004 | Reddy et al. ................. 166/295 |
| 2003/0230431 A1 | * | 12/2003 | Reddy et al. ................. 175/64 |

OTHER PUBLICATIONS

Halliburton brochure entitled "Bengum Squeeze Lost–Circulation Material" dated 2000.
Halliburton brochure entitled "Bentonite Cement Diesel Oil Slurry (BCDO) Lost–Circulation Material" dated 2000.
Halliburton brochure entitled "FlexPlug® OBM Lost–Circulation Material" dated 1999.
Halliburton brochure entitled "FlexPlug® W Lost–Circulation Material" Dated 1999.
Halliburton brochure entitled "Flocele Lost–Circulation Additive" dated 1999.
Halliburton brochure entitled Flo–Chek® Service Lost–Circulation Service dated 2000.
Halliburton brochure entitled "Gilsonte Lost–Circulation Additive" Dated 1999.
Halliburton brochure entitled "Granulite TR ¼Lost–Circulation Additive" dated 1999.
Halliburton brochure entitled Tuf Additive No. 2 Service Lost–Circulation Additive dated 1999.
SPE 59059 entitled "In–Situ Reactive System Stops Lost Circulation And Underground Flow Problems In Several Southern Mexico Wells" by Francisoc Rueda and Raul Bonifacio, presented Feb. 1–3, 2000.
SPE 56499 entitled "New Solutions For Subsalt–Well Lost Circulation And Optimized Primary Cementing" by R. Sweatman; R. Faul and C. Ballew, presented Oct. 3–6, 1999.
SPE/IADC 37671 entitled "New Solutions to Remedy Lost Circulation, Crossflows, and Underground" by Ronald E. Sweatman; Calvin W. Kessler; And John M. Hillier, presented Mar. 4–6, 1997.
Paper entitled "New Fluids and Processes Stabilize Wellbores During Drilling OPerations For Lower–Cost Well Construction and Enhanced Production" by Ron Sweatman; James Heathman, Ronnie Faul and Anthony Badalamenti, presented Mar. 30–31, 1999.

* cited by examiner

*Primary Examiner*—Philip C. Tucker
(74) *Attorney, Agent, or Firm*—Craig W. Roddy; Haynes & Boone, LLP

(57) ABSTRACT

A method and composition is provided for sealing a subterranean zone penetrated by a well bore and restoring lost circulation, wherein the composition basically comprises a mixture of latex, melamine-formaldehyde resin, and a catalyst.

69 Claims, No Drawings

COMPOSITIONS FOR SOLVING LOST CIRCULATION PROBLEMS

CROSS-REFERENCE TO RELATED APPLICATION

This application is a divisional of application Ser. No. 09/999,313, filed Nov. 15, 2001, now U.S. Pat. No. 6,508,306.

BACKGROUND

The present embodiment relates generally to compositions and methods of utilizing the compositions for sealing a subterranean zone penetrated by a well bore and restoring lost circulation.

While drilling oil and gas wells, a drilling fluid is circulated through a drill bit in a well bore and then back to the earth surface, thereby removing cuttings from the well bore. The drilling fluid is then reconditioned and reused. In the well bore, the drilling fluid maintains a predetermined hydrostatic pressure. However, such pressure is compromised ("lost circulation") once the drill bit encounters certain unfavorable subterranean zones, requiring remedial steps. For example, the pressure is lost when the drill bit encounters comparatively low pressure subterranean zones, such as vugs, fractures, and other thief zones. Similarly, encountering comparatively high pressure subterranean zones results in crossflows or underground blow-outs.

Most remedial steps comprise introducing a composition into the well bore to seal the above-described low pressure and high pressure subterranean zones. A cement composition can be used, but its relatively slow setting time is normally unacceptable. Much faster setting, and therefore more useful, compositions exist, for example, mixtures of clay and aqueous rubber latex or hydratable polymer (e.g., U.S. Pat. Nos. 5,913,364; 6,060,434; 6,167,967; 6,258,757) available from Halliburton Energy Services of Duncan, Okla., under the trademark "FLEXPLUG®" comprising compositions which become semi-solid upon contact with the drilling fluid, sealing the low pressure or high pressure subterranean zone. Cement can be added to the FLEXPLUG® systems where additional strength is required. However, under some circumstances, such as when re-drilling is desired, cement is undesirable, and a composition with greater flexibility and integrity is required to prevent erosion.

DESCRIPTION

A composition according to the present embodiment basically comprises a mixture of latex, melamine-formaldehyde resin, and a catalyst, for introduction into a subterranean zone penetrated by a well bore and restoring lost circulation.

The composition can be pumped down the well bore annulus while the drilling fluid is pumped through the drill bit. When the composition and drilling fluid contact each other at the bottom of the well, the resulting mixture will viscosity in the zones where the drilling fluid is being lost and restore circulation. The viscosified mixture eventually sets into a flexible, hard material, and prevents further drilling fluid losses when drilling is resumed.

In a first embodiment to be used with water-based drilling fluids, the composition comprises a mixture of latex, melamine-formaldehyde resin, and p-toluene sulfonic acid. The ratio of latex to melamine-formaldehyde resin varies from 30:70 to 70:30 percent by weight. Preferably, the ratio of latex to melamine-formaldehyde resin is maintained at a 50:50 percent ratio by weight. The p-toluene sulfonic acid may be present in an amount that is 0.5%–3% of the melamine-formaldehyde resin by weight, and is preferably present in an amount that is 1% of the melamine-formaldehyde resin by weight. The amount of p-toluene sulfonic acid required depends on the temperature. At low temperatures, higher levels of p-toluene sulfonic acid are required to react with latex. The composition can mixed with water-based drilling fluid in a ratio varying from 20:80 to 80:20 percent by weight or volume. The most preferred ratio of composition to water-based drilling fluid is 30:70 to 50:50 percent by weight or volume.

In a second embodiment to be used with oil-based drilling fluids, the composition comprises a mixture of latex, melamine-formaldehyde resin, p-toluene sulfonic acid, and a surfactant. The ratio of latex to melamine-formaldehyde resin varies from 30:70 to 70:30 percent by weight. Preferably, the ratio of latex to melamine-formaldehyde resin is maintained at a 50:50 percent ratio by weight. The p-toluene sulfonic acid may be present in an amount that is 0.5%–3% of the melamine-formaldehyde resin by weight, and is preferably present in an amount that is 1% of the melamine-formaldehyde resin by weight. The composition can mixed with oil-based drilling fluid in a ratio varying from 20:80 to 80:20 percent by weight or volume. The most preferred ratio of composition to oil-based drilling fluid is 30:70 to 50:50 percent by weight or volume. The surfactant is preferably present in an amount that is 1%–4% of the melamine-formaldehyde resin by weight.

For either embodiment, the composition preferably includes a latex comprising a styrene/butadiene copolymer latex emulsion prepared by emulsion polymerization. The weight ratio of styrene to butadiene in the latex can range from 10:90 to 90:10. The emulsion is a colloidal dispersion of the copolymer. The colloidal dispersion includes water from about 40–70% by weight of the emulsion. In addition to the dispersed copolymer, the latex often includes small quantities of an emulsifier, polymerization catalysts, chain modifying agents and the like. Also, styrene/butadiene latexes are often commercially produced as terpolymer latexes which include up to about 3% by weight of a third monomer to assist in stabilizing the latex emulsions. Non-ionic groups which exhibit stearic effects and which contain long ethoxylate or hydrocarbon tails can also be present.

Most preferably, the composition includes a latex with a styrene/butadiene weight ratio of about 25:75, with the styrene/butadiene copolymer suspended in a 50% by weight aqueous emulsion, available from Halliburton Energy Services of Duncan, Okla., under the trademark "LATEX 2000™."

As will be understood by those skilled in the art, the latex may be any of a variety of well known rubber materials commercially available in aqueous latex form, i.e., aqueous dispersions or emulsions. These include natural rubber (cis-1,4-polyisoprene), modified types thereof, synthetic polymers, and blends of the foregoing. The synthetic polymers include styrene/butadiene rubber, cis-1,4-polybutadiene, high styrene resin, butyl rubber, ethylene/propylene rubber, neoprene rubber, nitrile rubber, cis-1,4-polyisoprene rubber, silicone rubber, chlorosulfonated rubber, polyethylene rubber, epichlorohydrin rubber, fluorocarbon rubber, fluorosilicone rubber, polyurethane rubber, polyacrylic rubber and polysulfide rubber.

Melamine-formaldehyde resin is available from Borden Chemical Inc., Springfield, Oreg., under the trademark "ASTROMEL CR1™." Melamine-formaldehyde resins belong to the general class of amino resins which also include urea-formaldehyde resins, dihydroxyethyleneurea-formaldehyde resins, benzoguanine-formaldehyde resins and acetobenzoguanine-formaldehyde resins. When the melamine (2,4,6-triamino-s-triazine or cyanurotriamide) is reacted with formaldehyde in the presence of an acid catalyst, polymethylol melamine is formed by replacement of amino hydrogens with hydroxymethyl (methylol) groups. Depending on the amount of formaldehyde used, two to six amino hydrogens can be replaced by the methylol groups. These methylol groups are further reacted with short chain alcohols to convert the methylol groups into the alkyl ethers. Depending on the amount of short chain alcohol used, either few or all methylol groups can be etherified. Similar chemical modifications can be performed on the other amino resins. The water solubility of the final etherified amino resins, particularly of melamine based resins depends on the type and the number of moles of alcohol used for etherification, the number of unethrified methylol groups and the number of unreacted amino hydrogens and the degree of polymerization of the resin. In general amino resins partially etherified with methanol and are predominantly monomeric are water soluble, and are useful in the current invention. Other similar amino resins derived from urea, benzoguanine and dihydroxyethylene urea can also be used in the present invention. The amino resins of the present invention are water soluble, and can cross-link polymers containing hydroxyl, carboxyl, or amides and include polyesters, acrylics, epoxies, urethanes, cellulosics and polysaccharides in general. Such polymers may be used in the form of aqueous solutions, latexes or emulsions.

p-toluene sulfonic acid is available from Aldrich Chemical Co, Milwaukee, Wis., or Borden Chemical Inc., Springfield, Oreg., for example, in water soluble or pure forms. Alternatively, other acceptable catalysts include ammonium salts such as chloride, sulfate, and the like, or any organic acid, or metal salts such as magnesium salts.

With reference to the second embodiment, the surfactant is available from Halliburton Energy Services of Duncan, Okla., under the trademark "540C™." 540C surfactant is a sodium salt of nonylphenol that has been ethoxylated with 8–10 moles of ethylene oxide and terminated with carboxylate anion and is available as EMCOL CNP 110™ from Witco Chemical Co., Houston, Tex. Other surfactants which were also found to be effective include sulfonate salts of C15 alcohols ethoxylated with either 15 or 40 moles of ethylene oxide.

The following examples are illustrative of the methods and compositions discussed above.

EXAMPLE 1

In a Waring blender, 100 grams of LATEX 2000™ latex, 100 grams of ASTROMEL CR1™ melamine-formaldehyde resin, and p-toluene sulfonic acid (1% by weight of the melamine-formaldehyde resin) were mixed. The mixture was added to 100 grams of water-based drilling fluid available from Baroid Drilling Fluids, Houston, Tex. (comprising bentonite, clay, and viscosifying and fluid loss polymers) in a beaker and hand mixed quickly. The mixture was poured into a plastic receptacle and cured at 160° F. The mixture had set hard by the time the plastic receptacle was opened 24 hours later.

EXAMPLE 2

In a Waring blender, 100 grams of LATEX 2000™ latex, 100 grams of ASTROMEL CR1™ melamine-formaldehyde, 1 gram p-toluene sulfonic acid, and 540C™ surfactant (4% by weight of the melamine-formaldehyde resin) were mixed. The mixture was added to an equal volume of oil-based drilling fluid available from Baroid Drilling Fluids, Houston, Tex. (comprising ESCAID INVERMUL™ (15.0 ppg) oil-based drilling fluid prepared with ESCAID 110™, with EZ MUL NT™ emulsifier (polyaminated fatty acid), Lime, DURATONE HT™ filtration control (organophilic lignite), GELTONE II™ viscosifier (organophilic bentonite), SUSPENTONE™ viscosifier (organophilic attapulgite), DEEP TREAT™ wetting agent (sulfonate sodium salt), and $CaCl_2$) in a beaker and hand mixed quickly. The viscosity increase to form a creamy paste took less than a minute. The mixture was poured into a plastic receptacle and cured at 160° F. The mixture set hard in less than 2 hours.

EXAMPLE 3

Oil-based drilling fluids as described in TABLE 1 were prepared by Baroid Drilling Fluids, Houston, Tex.

TABLE 1

| Abbreviation for Oil-based Drilling Fluid | Description of components in Oil-based Drilling Fluid |
| --- | --- |
| A | PETROFREE SF 80/20 SWR ™ (15.0 ppg) 80% isomerized olefin - 20% $CaCl_2$ solution with LE MUL ™ emulsifier (oxidized tall oil), LE SUPERMULL ™ emulsifier (tall oil fatty acid-amidoamine), DURATONE HT ™ filtration control, GELTONE II ™ viscosifier, SUSPENTONE ™ viscosifier, X-VIS ™ yield activator (dimerized fatty acids), DEEP-TREAT ™ wetting agent, and $CaCl_2$ |
| B | Diesel Oil INVERMUL ™ (15.0 ppg) diesel-based drilling fluid with EZ MUL NT ™ emulsifier, INVERMUL NT ™ emulsifier (blend of oxidized tall oil and polyaminated fatty acid), Lime, DURATONE HT ™ filtration control, GELTONE II ™ viscosifier, SUSPENTONE ™ viscosifier, and $CaCl_2$ |
| C | ESCAID INVERMUL ™ (15.0 ppg) oil-based drilling fluid, with EZ MUL NT ™ emulsifier, Lime, DURATONE HT ™ filtration control, GELTONE II ™ viscosifier, SUSPENTONE ™ viscosifier, DEEP-TREAT ™ wetting agent, and $CaCl_2$ |
| D | PETROFREE LE 80/20 SWR ™ (15.0 ppg) 80% linear alpha olefin - 20% $CaCl_2$ solution with LE MUL ™ emulsifier, LE SUPERMULL ™ emulsifier, Lime, DURATONE HT ™ filtration control, GELTONE II ™ viscosifier, VIS-PLUS ™ stearic acid, and $CaCl_2$ |
| E | PETROFREE LV 80/20 SWR ™ (15.0 ppg) 80% $C_8$ ester - 20% $CaCl_2$ solution with EZ MUL NT ™ emulsifier, Lime, DURATONE HT ™ filtration control, GELTONE II ™ viscosifier, BDF-251 ™ ethoxylated proponated fatty alcohol, and $CaCl_2$ |

In a Waring blender, 100 grams of LATEX 2000™ latex, 100 grams of ASTROMEL CR1™ melamine-formaldehyde resin, 1 gram p-toluene sulfonic acid, and 540C™ surfactant (1%–4% by weight of the melamine-formaldehyde resin) were mixed. The mixture was added to an oil-based drilling fluid from TABLE 1 (A, B, C, D, or E) in a ratio listed in TABLE 2 in a beaker and hand mixed quickly. Typically, the viscosity increase to form a creamy paste took less than a minute. The mixture was poured into a plastic receptacle and cured at 160° F. Observations are listed in TABLE 2.

TABLE 2

| Abbreviation for Oil-based Drilling Fluid from TABLE 1 | Ratio of mixture to Oil-based Drilling Fluid (percentage by weight) | Amount of 540C ™ (percentage by weight of melamine-formaldehyde resin) | Setting Time at 160° F. (in hours) | Comments |
|---|---|---|---|---|
| A | 70:30 | 2 | — | Quick viscosity increase; firm set |
| A | 50:50 | 2 | — | Quick viscosity increase; firm set; better consistency |
| B | 70:30 | 2 | — | Would not mix - separates |
| B | 50:50 | 2 | — | Good viscosity increase; firm set; mixes well |
| B | 70:30 | 4 | — | Viscosity increase; firm set; thin, good consistency |
| B | 50:50 | 4 | — | Better than 70:30 (above) |
| C | 70:30 | 4 | <2 | Good set |
| C | 50:50 | 4 | <2 | Good set |
| C | 50:50 | 2 | <2 | Good set |
| D | 50:50 | 2 | <3 | Viscosity increased to non-pumpable consistency in less than a minute |
| D | 70:30 | 2 | <3 | Viscosity increase in less than a minute, but still pumpable |
| D | 50:50 | 4 | <3 | Viscosity increase in less than a minute; nice consistency |
| D | 70:30 | 4 | <3 | Viscosity increase in less than a minute; nice consistency |
| E | 70:30 | 4 | 6 | Thick, but good consistency when mixed |

As can be seen from TABLE 2, the second embodiment performs well in a variety of oil-based drilling fluids. For drilling fluid E, at room temperature the mixture simply became viscous and lost fluidity, whereas at 160° F., the mixture became a flexible, hard material with dimensional integrity and hardened within 6 hours.

Although only a few exemplary embodiments of this invention have been described in detail above, those skilled in the art will readily appreciate that many other modifications are possible in the exemplary embodiments without materially departing from the novel teachings and advantages of this invention. Accordingly, all such modifications are intended to be included within the scope of this invention as defined in the following claims.

What is claimed is:

1. A sealing composition comprising:
   a mixture comprising latex, melamine-formaldehyde resin and a catalyst; and
   a drilling fluid,
   wherein a viscous material forms when the mixture contacts the drilling fluid.

2. The composition of claim 1 wherein the latex is a styrene/butadiene copolymer emulsion.

3. The composition of claim 2 wherein the latex has a styrene/butadiene weight ratio of about 25:75, with the styrene/butadiene copolymer suspended in a 50% by weight aqueous emulsion.

4. The composition of claim 1 wherein the catalyst is an ammonium salt, an organic acid, or a metal salt.

5. The composition of claim 1 wherein the catalyst is p-toluene sulfonic acid.

6. The composition of claim 5 wherein the p-toluene sulfonic acid is present in a range of 0.5%–3% of the melamine-formaldehyde resin by weight.

7. The composition of claim 5 wherein the p-toluene sulfonic acid is present in an amount that is 1% of the melamine-formaldehyde resin by weight.

8. The composition of claim 1 wherein the ratio of latex to melamine-formaldehyde resin is in a range from 30:70 to 70:30 percent by weight.

9. The composition of claim 1 wherein the ratio of latex to melamine-formaldehyde resin is 50:50 percent by weight.

10. The composition of claim 1 further comprising a surfactant.

11. The composition of claim 10 wherein the surfactant is preferably present in an amount that is in a range of 1%–4% of the melamine-formaldehyde resin by weight.

12. The composition of claim 10 wherein the surfactant is a sodium salt of nonylphenol that has been ethoxylated with 8–10 moles of ethylene oxide and terminated with carboxylate anion.

13. A composition for sealing a subterranean zone penetrated by a well bore and restoring lost circulation comprising:
   a mixture comprising latex, melamine-formaldehyde resin, and a catalyst; and
   a drilling fluid,
   wherein a viscous material forms when the mixture and the drilling fluid are brought into contact in the subterranean zone, thereby sealing the subterranean zone and restoring lost circulation.

14. The composition of claim 13 wherein the latex is a styrene/butadiene copolymer emulsion.

15. The composition of claim 14 wherein the latex has a styrene/butadiene weight ratio of about 25:75, with the styrene/butadiene copolymer suspended in a 50% by weight aqueous emulsion.

16. The composition of claim 13 wherein the catalyst is an ammonium salt, an organic acid, or a metal salt.

17. The composition of claim 13 wherein the catalyst is p-toluene sulfonic acid.

18. The composition of claim 17 wherein the p-toluene sulfonic acid is present in a range of 0.5%–3% of the melamine-formaldehyde resin by weight.

19. The composition of claim 17 wherein the p-toluene sulfonic acid is present in an amount that is 1% of the melamine-formaldehyde resin by weight.

20. The composition of claim 13 wherein the ratio of latex to melamine-formaldehyde resin is in a range from 30:70 to 70:30 percent by weight.

21. The composition of claim 13 wherein the ratio of latex to melamine-formaldehyde resin is 50:50 percent by weight.

22. The composition of claim 13 further comprising a surfactant.

23. The composition of claim 22 wherein the surfactant is preferably present in an amount that is in a range of 1%–4% of the melamine-formaldehyde resin by weight.

24. The composition of claim 22 wherein the surfactant is a sodium salt of nonylphenol that has been ethoxylated with 8–10 moles of ethylene oxide and terminated with carboxylate anion.

25. The composition of claim 13 wherein the drilling fluid is oil-based.

26. The composition of claim 13 wherein the drilling fluid is water-based.

27. The composition of claim 13 wherein the drilling fluid is added to the mixture in a range from 20:80 to 80:20 percent by weight or volume of the composition.

28. The composition of claim 13 wherein the drilling fluid is added to the mixture in a range from 30:70 to 50:50 percent by weight or volume of the composition.

29. A sealing composition comprising:
   latex, melamine-formaldehyde resin and a catalyst;
   which latex is a styrene/butadiene copolymer emulsion having a styrene/butadiene weight ratio of about 25:75, with the styrene/butadiene copolymer suspended in a 50% by weight aqueous emulsion.

30. The composition of claim 29 wherein the catalyst is an ammonium salt, an organic acid, or a metal salt.

31. The composition of claim 29 wherein the catalyst is p-toluene sulfonic acid.

32. The composition of claim 31 wherein the p-toluene sulfonic acid is present in a range of 0.5%–3% of the melamine-formaldehyde resin by weight.

33. The composition of claim 31 wherein the p-toluene sulfonic acid is present in an amount that is 1% of the melamine-formaldehyde resin by weight.

34. The composition of claim 29 wherein the ratio of latex to melamine-formaldehyde resin is in a range from 30:70 to 70:30 percent by weight.

35. The composition of claim 29 wherein the ratio of latex to melamine-formaldehyde resin is 50:50 percent by weight.

36. The composition of claim 29 further comprising a surfactant.

37. The composition of claim 36 wherein the surfactant is present in an amount that is in a range of 1%–4% of the melamine-formaldehyde resin by weight.

38. The composition of claim 36 wherein the surfactant is a sodium salt of nonylphenol that has been ethoxylated with 8–10 moles of ethylene oxide and terminated with carboxylate anion.

39. A composition for sealing a subterranean zone penetrated by a well bore and restoring lost circulation comprising:
   a latex comprising a styrene/butadiene copolymer emulsion and having a styrene/butadiene weight ratio of about 25:75, with the styrene/butadiene copolymer suspended in a 50% by weight aqueous emulsion;
   a melamine-formaldehyde resin, and
   a catalyst,
   which composition is placed into the subterranean zone and contacts a drilling fluid to form a viscous material, thereby sealing the subterranean zone and restoring lost circulation.

40. The composition of claim 39 wherein the catalyst is an ammonium salt, an organic acid, or a metal salt.

41. The composition of claim 39 wherein the catalyst is p-toluene sulfonic acid.

42. The composition of claim 41 wherein the p-toluene sulfonic acid is present in a range of 0.5%–3% of the melamine-formaldehyde resin by weight.

43. The composition of claim 41 wherein the p-toluene sulfonic acid is present in an amount that is 1% of the melamine-formaldehyde resin by weight.

44. The composition of claim 39 wherein the ratio of latex to melamine-formaldehyde resin is in a range from 30:70 to 70:30 percent by weight.

45. The composition of claim 39 wherein the ratio of latex to melamine-formaldehyde resin is 50:50 percent by weight.

46. The composition of claim 39 further comprising a surfactant.

47. The composition of claim 46 wherein the surfactant is present in an amount that is in a range of 1%–4% of the melamine-formaldehyde resin by weight.

48. The composition of claim 46 wherein the surfactant is a sodium salt of nonylphenol that has been ethoxylated with 8–10 moles of ethylene oxide and terminated with carboxylate anion.

49. The composition of claim 39 wherein the drilling fluid is oil-based.

50. The composition of claim 39 wherein the drilling fluid is water-based.

51. The composition of claim 39 wherein the drilling fluid is added to the mixture in a range from 20:80 to 80:20 percent by weight or volume of the composition.

52. The composition of claim 39 wherein the drilling fluid is added to the mixture in a range from 30:70 to 50:50 percent by weight or volume of the composition.

53. A composition for sealing a subterranean zone penetrated by a well bore and restoring lost circulation comprising:
   latex, melamine-formaldehyde resin, a catalyst and a surfactant;
   wherein the surfactant is a sodium salt of nonylphenol that has been ethoxylated With 8–10 moles of ethylene oxide and terminated with carboxylate anion; and
   wherein the composition is placed into the subterranean zone and contacts a drilling fluid to form a viscous material, thereby sealing the subterranean zone and restoring lost circulation.

54. The composition of claim 53 wherein the latex is a styrene/butadiene copolymer emulsion.

55. The composition of claim 53 wherein the catalyst is an ammonium salt, an organic acid, or a metal salt.

56. The composition of claim 53 wherein the catalyst is p-toluene sulfonic acid.

57. The composition of claim 56 wherein the p-toluene sulfonic acid is present in an amount that is 1% of the melamine-formaldehyde resin by weight.

58. The composition of claim 53 wherein the ratio of latex to melamine-formaldehyde resin is 50:50 percent by weight.

59. The composition of claim 53 wherein the drilling fluid is oil-based.

60. The composition of claim 53 wherein the drilling fluid is water-based.

61. The composition of claim 53 wherein the drilling fluid is added to the composition in a range from 20:80 to 80:20 percent by weight or volume of the composition.

62. The composition of claim 53 wherein the drilling fluid is added to the composition in a range from 30:70 to 50:50 percent by weight or volume of the composition.

63. A sealing composition comprising:
latex;
melamine-formaldehyde resin;
a surfactant; and
p-toluene sulfonic acid,
wherein the p-toluene sulfonic acid is present in a range of 0.5%–3% of the melamine-formaldehyde resin by weight; and
wherein the surfactant is a sodium salt of nonylphenol that has been ethoxylated with 8–10 moles of ethylene oxide and terminated with carboxylate anion.

64. The composition of claim 63 wherein the latex is a styrene/butadiene copolymer emulsion.

65. The composition of claim 64 wherein the latex has a styrene/butadiene weight ratio of about 25:75, with the styrene/butadiene copolymer suspended in a 50% by weight aqueous emulsion.

66. The composition of claim 63 wherein the p-toluene sulfonic acid is present in an amount that is 1% of the melamine-formaldehyde resin by weight.

67. The composition of claim 63 wherein the ratio of latex to melamine-formaldehyde resin is in a range from 30:70 to 70:30 percent by weight.

68. The composition of claim 63 wherein the ratio of latex to melamine-formaldehyde resin is 50:50 percent by weight.

69. The composition of claim 63 wherein the surfactant is present in an amount that is in a range of 1%–4% of the melamine-formaldehyde resin by weight.

* * * * *